US007511617B2

(12) United States Patent
Burman et al.

(10) Patent No.: US 7,511,617 B2
(45) Date of Patent: Mar. 31, 2009

(54) ELECTRONIC SHIPPING LABEL WITH UPDATEABLE VISUAL DISPLAY

(75) Inventors: Robert F. Burman, Lawrenceville, GA (US); Robert V. Nonneman, Norcross, GA (US); Thomas Ramsager, Roswell, GA (US); Albert L. Wright, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 678 days.

(21) Appl. No.: 11/105,924

(22) Filed: Apr. 13, 2005

(65) Prior Publication Data

US 2005/0237203 A1    Oct. 27, 2005

Related U.S. Application Data

(60) Provisional application No. 60/561,958, filed on Apr. 13, 2004.

(51) Int. Cl.
*G08B 13/14* (2006.01)
(52) U.S. Cl. .......................... 340/572.1; 345/55; 345/87; 343/703
(58) Field of Classification Search .............. 340/572.8, 340/5.91, 572.1; 345/2, 55, 87; 343/703
See application file for complete search history.

(56) References Cited

U.S. PATENT DOCUMENTS

| 5,151,684 | A | 9/1992 | Johnsen |
| 5,153,842 | A | 10/1992 | Dlugos, Sr. et al. |
| 5,245,534 | A | 9/1993 | Waterhouse et al. |
| 5,348,485 | A | 9/1994 | Briechle et al. |
| 5,537,126 | A | 7/1996 | Kayser et al. |
| 5,575,100 | A | 11/1996 | Marvin et al. |
| 5,619,416 | A | 4/1997 | Kosarew |
| 5,963,133 | A | 10/1999 | Monjo |
| 5,971,587 | A | 10/1999 | Kato et al. |

(Continued)

FOREIGN PATENT DOCUMENTS

DE    197 30 051 A1    2/1999

(Continued)

OTHER PUBLICATIONS

International Search Report from corresponding International Application No. PCT/US05/012518 dated Mar. 13, 2005.

(Continued)

*Primary Examiner*—George A Bugg
*Assistant Examiner*—Edny Labbees
(74) *Attorney, Agent, or Firm*—Alston & Bird LLP

(57) ABSTRACT

A novel shipping label is described that includes an electronically updateable visual display that can be updated throughout the shipping process to provide routing instructions to package handlers. Instructions shown on the updateable display can provide such information as an indication of a particular conveyor belt or vehicle or a particular location in a vehicle for the package to be placed. A label interface device for updating the new shipping label is also described herein along with systems for updating the shipping label over the course of the package delivery. In addition, novel methods of providing shipping services that are made possible by these devices and systems are included in the disclosure.

80 Claims, 13 Drawing Sheets

U.S. PATENT DOCUMENTS

| | | | |
|---|---|---|---|
| 6,031,585 A * | 2/2000 | Stevens, III | 349/1 |
| 6,131,811 A | 10/2000 | Gangi | |
| 6,184,834 B1 * | 2/2001 | Utsumi et al. | 343/702 |
| 6,243,690 B1 * | 6/2001 | Adamec et al. | 705/20 |
| 6,271,814 B1 | 8/2001 | Kaoh | |
| 6,450,407 B1 | 9/2002 | Freeman et al. | |
| 6,680,452 B2 * | 1/2004 | Takizawa | 209/583 |
| 6,721,617 B2 | 4/2004 | Kato et al. | |
| 6,753,830 B2 * | 6/2004 | Gelbman | 345/55 |
| 6,806,924 B2 * | 10/2004 | Niiyama et al. | 349/72 |
| 2001/0020935 A1 | 9/2001 | Gelbman | |
| 2002/0167500 A1 | 11/2002 | Gelbman | |
| 2003/0014143 A1 | 1/2003 | Kato et al. | |
| 2004/0012485 A1 * | 1/2004 | Sundqvist | 340/5.91 |
| 2004/0143354 A1 | 7/2004 | Kato et al. | |
| 2005/0171662 A1 | 8/2005 | Strege et al. | |
| 2005/0218218 A1 | 10/2005 | Koster | |
| 2006/0164327 A1 * | 7/2006 | Rosander et al. | 345/2.1 |
| 2007/0152045 A1 * | 7/2007 | Erickson et al. | 235/385 |

FOREIGN PATENT DOCUMENTS

| | | |
|---|---|---|
| EP | 1345116 A1 | 9/2003 |
| WO | WO 00/16189 | 3/2000 |
| WO | WO 00/67110 A | 11/2000 |
| WO | WO 02/063602 A1 | 8/2002 |
| WO | WO 02/071382 A1 | 9/2002 |
| WO | WO 2004/021239 A | 3/2004 |
| WO | WO 2004021239 A1 * | 3/2004 |

OTHER PUBLICATIONS

Office Action dated Mar. 17, 2008 from corresponding U.S. Appl. No. 11/105,925.

Office Communication from corresponding U.S. Appl. No. 11/105,926 dated Jun. 18, 2008.

Office Communication from corresponding U.S. Appl. No. 11/105,925 dated Jul. 29, 2008.

* cited by examiner

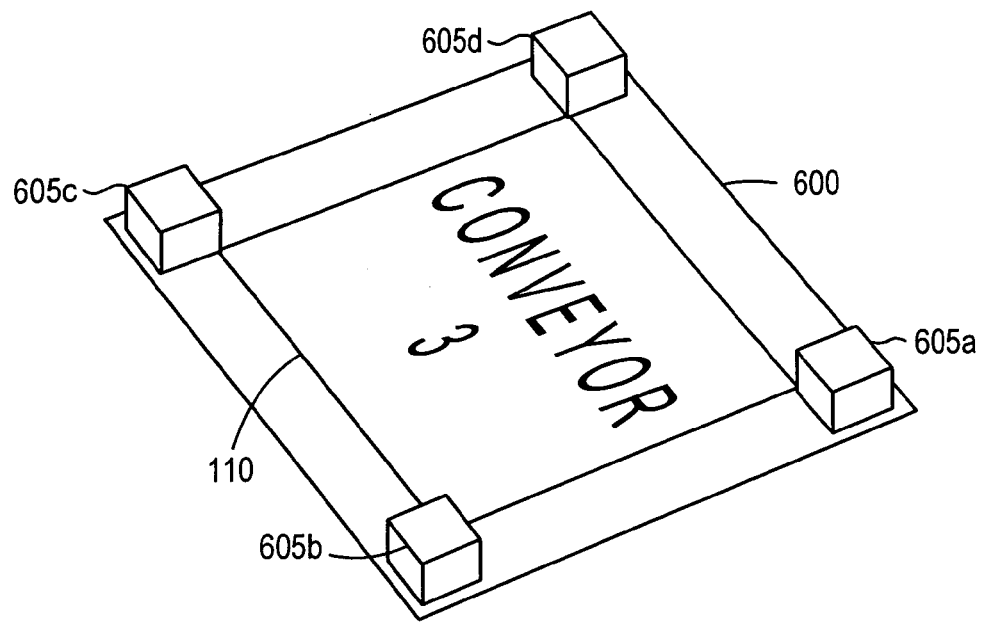
FIG. 7A
FIG. 7B     FIG. 7C     FIG. 7D     FIG. 7E
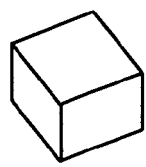 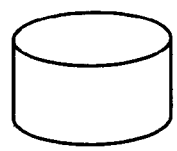 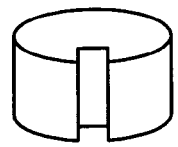 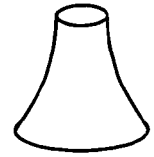
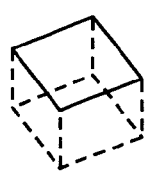 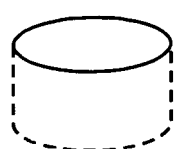 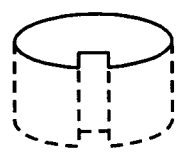 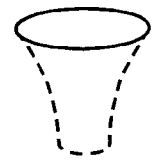

ELECTRONIC SHIPPING LABEL WITH UPDATEABLE VISUAL DISPLAY

CROSS-REFERENCE TO RELATED APPLICATIONS

This application claims priority to provisional U.S. patent application No. 60/561,958 filed Apr. 13, 2004 entitled Electronic Shipping Label.

BACKGROUND OF THE INVENTION

While complex sorting mechanisms, conveyor systems, and other machinery are commonly involved in routing packages in the package delivery industry, many steps still exist where packages are handled by human package service providers who perform manual steps to properly route parcels to their intended destination. These steps may occur during any portion of the delivery process, but commonly occur while the package is being processed at a package delivery company hub. Here the packages can be routed to vehicles for transportation to another hub or sent to be loaded onto parcel delivery vehicles for final delivery at their destinations.

Often, a manual routing step requires that a human package service provider have detailed knowledge and/or experience regarding the package delivery and routing process. For example, a package service provider might be required to determine whether a package should be sent to a parcel delivery vehicle, or instead forwarded on to another hub based on the destination zip code found on the shipping label of the package. Another example would be a package service provider determining where on a package delivery vehicle to place a package once the proper delivery vehicle has been determined. Developing the knowledge to be able to make repeated determinations such as these can require substantial training. Even after adequate training, mistakes can occasionally occur that cause delays in package delivery times.

The training required for a package service provider to become efficient at his or her manual routing duties can be costly in terms of both time and money. In addition, the cost associated with this training becomes an obstacle to changes in delivery processes/operations. That is, hub processes tend to remain static where such manual steps are involved. Potentially beneficial process improvements that cannot provide a benefit greater than the cost of retraining affected package service providers are generally not implemented.

Additional package shipping data beyond that contained on a package shipping label itself commonly resides in one or more package shipping company databases, stored in one or more tables using the package tracking number as the primary key. This information can contain additional routing information that would ease the human memory burden on package service providers if the information were available to the package service providers. In addition, the information contained in the shipping company databases can be dynamic. That is, information regarding the package can change during the delivery process. For example, a customer may wish to receive a higher level of service than was previously indicated, or even send the package to a different address than was initially indicated.

However, providing all package service providers in a package delivery enterprise with access to the additional package shipping data in the database(s) would require that each of these employees be given, for example, a terminal that could retrieve information from the database(s) regarding a given package based on the package tracking number read from the package by reading a barcode or radio frequency identification tag. Unfortunately such equipment would be too expensive to be practicable. What is needed then is a relatively inexpensive device that dynamically displays information from a package delivery database in a human readable form on a package to provide routing and/or handling information.

BRIEF SUMMARY OF THE INVENTION

According to various embodiments, a shipping label of the invention comprises an electronically updateable visual display that can be updated throughout the shipping process to provide handling instructions to human package service providers. The shipping label can carry a unique package identifier which can be located on the visual display, in a radio frequency identification tag component of the label, or on a standard paper component of the shipping label. The unique package identifier can be a barcode, stored in the memory of a radio frequency identification tag, or stored in other machine readable forms.

In one embodiment the shipping label comprises an electronically updateable visual display and standard paper, and the unique package identifier is stored in the form of a barcode on the standard paper.

In another embodiment, the shipping label comprises an electronically updateable visual display and a radio frequency identification tag, and the unique package identifier is stored in the memory of radio frequency identification tag. The radio frequency identification tag can be configured to transmit the package identifier upon being interrogated by an external device.

In yet another embodiment, the shipping label can include an electronically updateable visual display, standard paper, and a radio frequency identification tag.

In those embodiments that include a radio frequency identification tag, the radio frequency identification tag can be of the read only type, or it can be writeable, rewriteable, and erasable. Where the radio frequency identification tag is writeable, rewriteable, and erasable, a portion of the memory of the radio frequency identification tag can be mapped to the visual display in such a way that writing to the memory of the radio frequency identification tag causes the visual display to be updated. The shipping label can include an electric field generator located behind the updateable visual display to create an electric field that operates to change the output of the visual display. The electric field generator can be configured to create an electric field based on a portion of the writeable memory of the radio frequency identification tag.

In various embodiments, the display can be configured to show one color where a positive electric field is applied to an area on the visual display, and a second color where a negative electric field is applied. The visual display can be configured to retain its output after the electric field is removed. The visual display can comprise electronic paper. The label can be configured to be updated by an external label interface device capable of generating an electric field.

In embodiments in which the updateable visual display comprises electronic paper, the label can include a guide for spatially orienting the external device with respect to the updateable visual display. The guide can be configured to slideably interface with an external device. For this purpose, the external device has an area for generating an electric field that is smaller than the surface area of the visual display. The label can include physical features for communicating a distance to an external device configured to slideably interface with the label. Alternatively, the external device can be configured to measure its movement relative to the label without the need for measuring features to be located on the label.

In some embodiments in which the label device comprises an electric field generator, voltage can be applied to the electric field generator through a plurality of terminals accessible by an external device. Voltage applied to the external pins can cause the electric field generator to apply an electric field to the visual display, changing its output.

In another embodiment, the invented shipping label comprises an electronically updateable display, a processor, a memory, and a wireless radio. A unique package identifier can be stored in the memory, and the processor can be configured to transmit the unique package identifier to an external device through the wireless radio. The processor can be further configured to receive instructions from an external device and to update the visual display.

The invented label can be powered by an internal power source such as a battery, or powered through an inductive power source, a capacitive power source, or through power input terminals.

Also disclosed herein is a device for updating a shipping label having an updateable visual display. The label interface device can include an electric field generator and a communication device for exchanging data with an external device such as an external computer. The device can be configured to update a visual display comprising electronic paper. The device can also include an optical scanner for reading a barcode of the shipping label. Some embodiments of the label interface device can include a radio frequency identification tag reader.

A processor of the label interface device can be configured to activate an optical scanner of the interface device to obtain a unique package identifier from a barcode of a shipping label, form a database query based on the package identifier, send the query to a computer database, receive a query response from the computer database, and update the visual display based on the information received from the computer database.

A processor of the label interface device can be configured to activate a radio frequency identification tag reader of the interface device to obtain a unique package identifier from a radio frequency identification tag of a shipping label, form a database query based on the package identifier, send the query to a computer database, receive a query response from the computer database, and update the visual display based on the information received from the computer database.

In some embodiments in which the label interface device includes an electric field generator, the label interface device can be configured to slideably interface with the invented shipping label. The label interface device can include a distance measuring device for measuring movement of the electric field generator relative to the visual display. The label interface device can be configured to modify the output of the electric field generator based on the measured relative movement.

A system for shipping packages implementing the invented label and label interface device can include a shipping database, a package having an electronically updateable visual display and a machine readable package identifier, and at least one device configured to read the package identifier. The system also includes memory and a processor configured to form a database query based on the package identifier and retrieve package data from the shipping database corresponding to the package. The system further includes at least one device configured to update the visual display with information based on the package data retrieved from the database.

A method of routing a package from an origin to a destination using the invented label and label interface device can comprise affixing a package shipping label having an electronically updateable visual display to the package, affixing a machine-readable package identifier to the package, and electronically writing package handling instructions to the updateable visual display in a human perceivable form to provide shipping instructions to human package service providers.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 7A-7E illustrate a guide for physically orienting an external device relative to the updatable visual display of an invented shipping label.

DETAILED DESCRIPTION OF THE INVENTION

Figure 1:
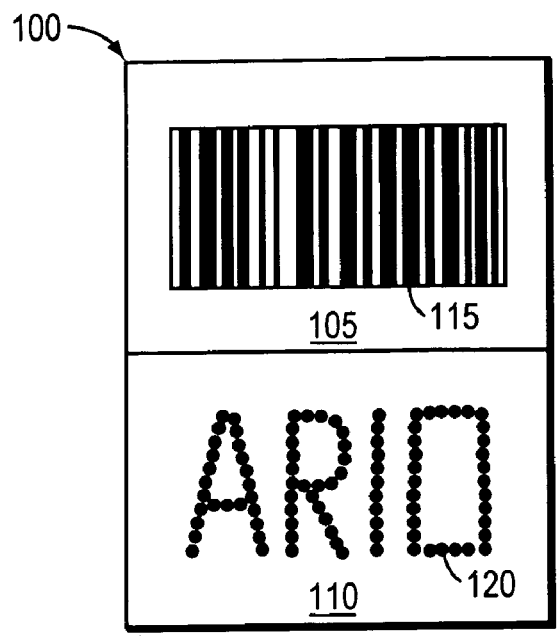
FIG. 1 shows an embodiment of a shipping label according to the present invention.

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The present invention is described below with reference to block diagrams and flowchart illustrations of methods, apparatus (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the system or flowchart blocks.

These computer program instructions may also be stored in a processor-readable memory that can direct a computer or other programmable data processing apparatus to function in a particular manner, such that the instructions stored in the memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems which perform the specified functions or steps, or combinations of special purpose hardware and computer instructions.

The invented device comprises a label that integrates a machine-readable label or tag with an updateable visual display. In use, scanning, interrogating or otherwise reading the machine-readable tag provides an identifier for the object on which the label is placed. The identifier can be a unique package identifier such as a shipping company's package tracking number. This information can then be used to retrieve information regarding the object that is stored in a computer database. Information retrieved from the database can then be used to update the visual display. The result is a versatile, dynamic label that can be used in parcel shipping and delivery applications and/or for inventory management.

An example of the invented device is shown in FIG. 1. The integrated label 100 includes a portion made of standard paper 105 and an updateable visual display portion 110 that can be updated to display human-readable information. The standard paper portion of the label includes a machine-readable barcode 115. The updateable display portion 110 shown in FIG. 1 is depicted as displaying "AR10".

The updateable visual display is human readable. That is, the display presents information in a form that is perceptible to the human eye. The type of updateable display can be any of a number of types of human readable displays. Examples of such displays can include, but are not limited to, liquid crystal displays, light emitting diode displays, vacuum fluorescent displays, and active matrix displays. These displays are generally electronically writable, rewriteable, and erasable.

The aforementioned displays are well known in the art and can be used as the updateable human readable display portion of the invented device. The widespread use of such displays as package identification labels, shipping labels, or as portions thereof may not be practicable due to the cost of the display devices themselves, the cost to provide adequate power to keep the devices functional, and/or the fragility of the displays. This is especially true for embodiments of the present invention that are intended to be disposable. Where the device is intended to be reusable, liquid crystal displays, light emitting diode displays, vacuum fluorescent displays, and active matrix displays are more likely to be of more practical use as the updateable visual display of the invented device.

Newer display technologies have recently been developed that can potentially provide lower cost, more power efficiency, and more rugged displays. The newer display technologies comprise electronic media that more closely resemble the appearance of actual paper in thickness and contrast, as compared to the aforementioned technologies, and still provide the ability to electronically write, re-write, and erase the display. Such electronic media is now commercially available. This electronic media potentially offers a relatively high contrast ratio, lower cost per display, lower power requirements, and higher durability that the previously mentioned electronically updateable display technologies.

One commercially available form of electronic media comprises a number of small spheres disposed between upper and lower layers of plastic. The spheres, or beads, have one black colored hemisphere and one white colored hemisphere. The black and white hemispheres contain opposite charges so that they can be rotated through electronic manipulation to form the desired visual display.

Another commercially available version of electronic media comprises a number of small liquid filled capsules. Along with the transparent liquid, the capsules contain oppositely charged white and black particles that float freely within the liquid. By applying an electric field the white or black particles can alternatively be forced to the surface or to the bottom of the capsules to create the desired visual display.

Forms of electronic media such as these and any similar technologies will be collectively referred to as "electronic paper" throughout the remainder of this disclosure. The electronic paper technologies require that power be applied to generate the electric field for creating or altering the image shown on the visual display. The generated image is generally static until another electric field is applied. This reduced, intermittent power requirement is beneficial for use in the invented device as will be seen. As will be appreciated by one of skill in the art, media incorporating material that can be magnetically manipulated in similar manner as the electronic paper described above can also be used as the updateable visual display of the present invention.

The machine-readable label or tag included on or in the device can comprise any label or tag that is capable of being read, scanned, and/or interrogated by a machine or computer. Examples of such labels or tags are barcodes as shown in FIG. 1, multi-dimensional barcodes known in that art such as a Maxicode symbol, and radio frequency identification (RFID) tags.

The invented device shown in FIG. 1 is depicted as using electronic paper for its updateable visual display 110. The text message 120 is drawn as being comprised of dots, but the effect is exaggerated in the figure. Electronic paper can have much higher resolution such that individual spheres are imperceptible without magnification. The electronic paper form having the liquid filled capsules can even be partially or fractionally addressed such that the capsule displays a pixel or dot that is partially black and partially white. This can provide even higher resolution. The updatable visual display is shown as electronic paper, but as indicated above, other display technologies can be used for the updateable visual display. The displays can incorporate color if desired. While color versions of electronic paper are not currently available, use of color capable electronic paper as the updateable visual display is within the scope of the present invention.

Figure 2:
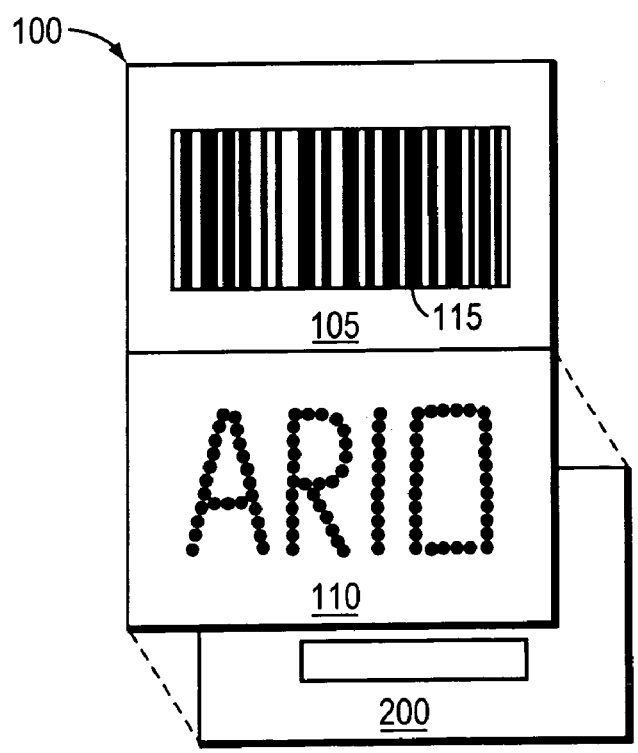
FIG. 2 shows a shipping label of the invented shipping label having an RFID tag.

The device can include more than one machine-readable label or tag if desired. In FIG. 2 a label according to the present invention is shown that includes both a barcode 115 on standard paper 105 and an RFID tag 200. The RFID tag of the label is depicted as being attached to the label behind the updateable visual display 110 of the label, but could be located beneath the standard paper 105, or beneath both the standard paper 105 and the updateable visual display 110, or located on the surface of the label.

In addition, optical character recognition (OCR) technology can be implemented to allow a machine or computer to read numbers or text on the invented label. This can make a number of areas of the invented label machine-readable. Using OCR, however, is generally not as reliable as utilizing barcodes or RFID, such that the latter are preferred for use in the invented device.

Figure 3:
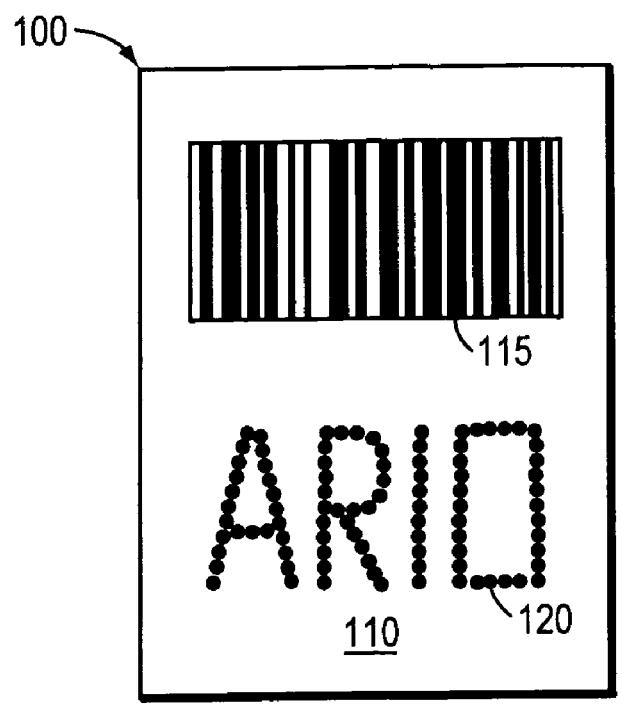
FIG. 3 depicts a shipping label according to the present invention having a barcode on the updateable visual display.

In some embodiments such as the embodiment depicted in FIG. 3, where the machine-readable label or tag is an optical label, the machine-readable label can even be located on the electronically updateable visual display. For example, through the application of an electric field, a bar code 115 or other machine-readable label may be displayed on the electronic paper 110. An optical scanning device such as a barcode reader can then be used to read the barcode displayed on the electronic paper. As such, the invented device can be comprised entirely of electronic paper or other updateable visual display types so long as a machine or computer can read a portion of the invented label. Indeed, an entire shipping label can be comprised of electronic paper or other updateable visual display type. Preferably though, paper or RFID portions are included as well to ensure that a package can be identified in the event of an accidental erasure of the updateable visual display.

Figure 4:
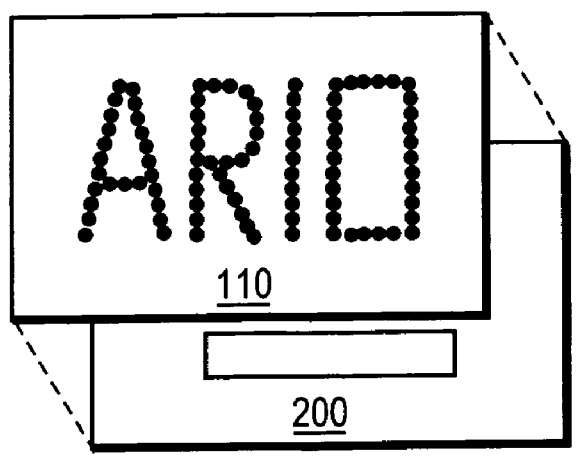
FIG. 4 shows an embodiment of the invented label having an updateable visual display and an RFID tag without a standard paper component.
Figure 5:
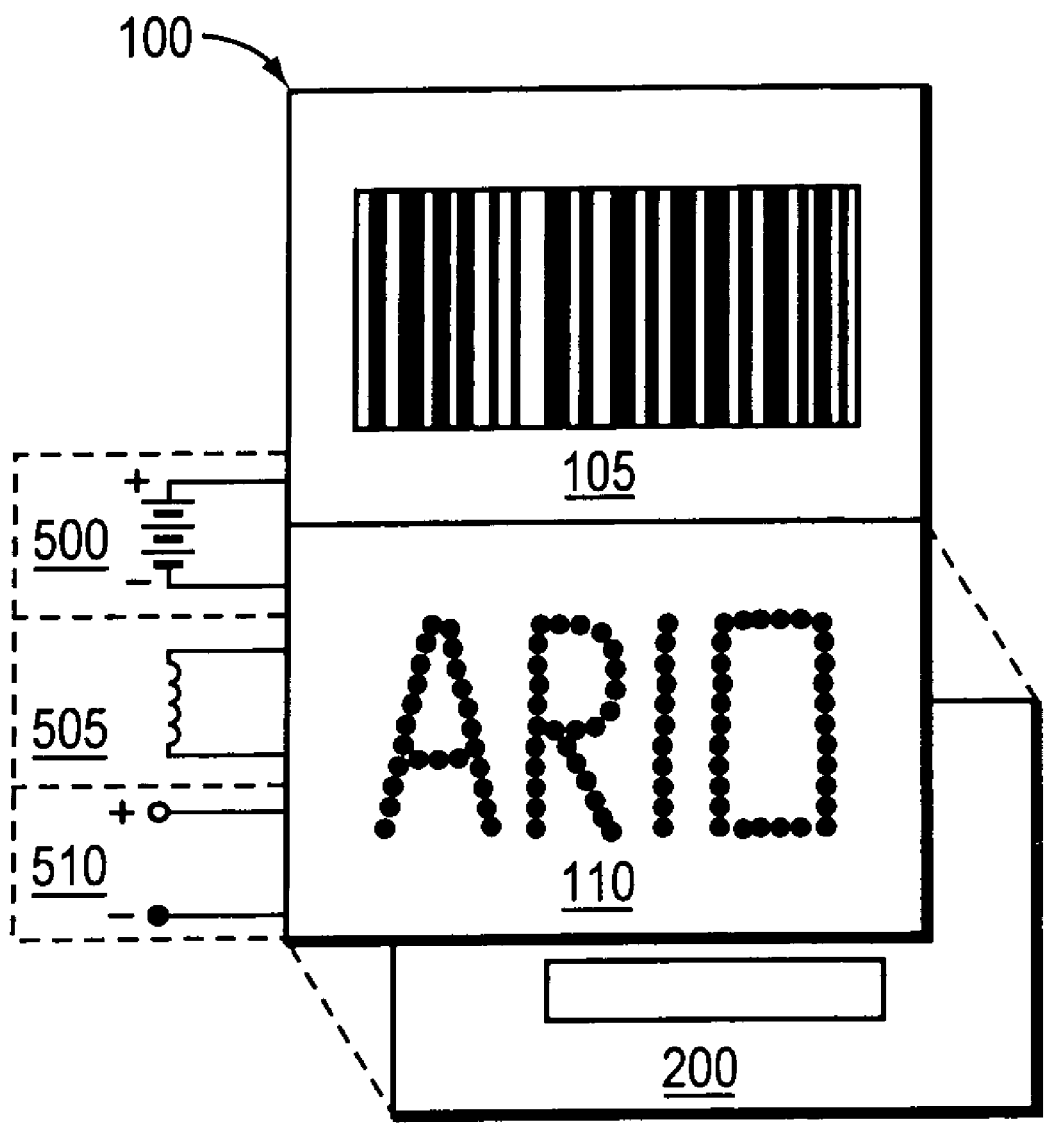
FIG. 5 illustrates various options for supplying power to the invented label.

FIG. 4 shows yet another embodiment of the invented device which includes an updateable display 110 and an RFID tag 200 in which the invented label has no standard paper component. FIG. 5 shows the label of FIG. 2 along with a number of alternative power supply options to provide power to the updateable visual display portion of the device. A battery 500, can be used to power the display. If a battery is used as the power supply for the device, the battery is preferably small and inexpensive at least in disposable label embodiments. A reusable label, as mentioned previously, is within the scope of the invention. A reusable label according to the invention could have a larger battery as its power supply. In addition, the use of display technologies such as liquid crystal displays, light emitting diode displays, vacuum fluorescent displays, and active matrix displays as the updateable visual display of the invention might be more practical in a reusable form of the invention and these would likely require the use of a larger battery or batteries.

An inductive power source 505 is also shown. Placing the coil in an electromagnetic field or generation of an electromagnetic field near the coil creates an electrical current through the coil to supply power to the device. RFID tags also use inductive coupling for power. A label according to the present invention that includes an RFID tag can be configured such that a single coil powers both the RFID tag and the updatable visual display. Capacitive powering techniques are also possible. Another technique for powering the device is through the use of externally accessible electrical terminals 510 as shown in FIG. 5. The use of these terminals would require that physical contact be made between the contacts and an external power source.

Some embodiments of the invented label do not require the power sources depicted in FIG. 5. As will be shown, a label interface device according to the present invention can include an electric field generator that, when placed in proximity to the updateable visual display, will write to the visual display.

A number of methods can be used to make the image or text displayed on the updateable visual display device. These vary with the type of display technology used to implement the updateable visual display. Methods of displaying an image on liquid crystal displays, light emitting diode displays, vacuum fluorescent displays, and active matrix displays are well known in the art and will not be described here. As mentioned previously, an electric field creates the image displayed by electronic paper. The application of a positive or negative charge in the vicinity of the electronic paper causes the spheres to rotate in the two colored sphere form of electronic paper, and causes the pigmented particles to move within the capsules of the liquid filled capsule form of electronic paper. An electric field that alternates between positive and negative applied across the surface of the electronic paper in the correct locations can cause the desired output image to be displayed on the electronic paper. This image then remains on the electronic paper after the electric field is removed. This image is static and is displayed until the application of a different electric field alters the image.

The updateable visual display of the invented apparatus can be written to in a number of ways. For example, a writer device having a surface capable of generating a localized electric field can be used. Such a surface may be referred to herein as an electric field generator. The device would be able to create positive or negative charges across a grid of points on this surface. The area of the surface having the grid of charged points would be equal to the area of the electronic paper that is being written. The positive and negative charges would appear on the grid in the shape of the image that is to be written to the electronic paper. By bringing the writer device near the electronic paper, the shape represented by the electric field on the grid is transferred to the electronic paper through the repulsion and attraction of charges located on the pigmented spheres or particles within the electronic paper.

Figure 6:
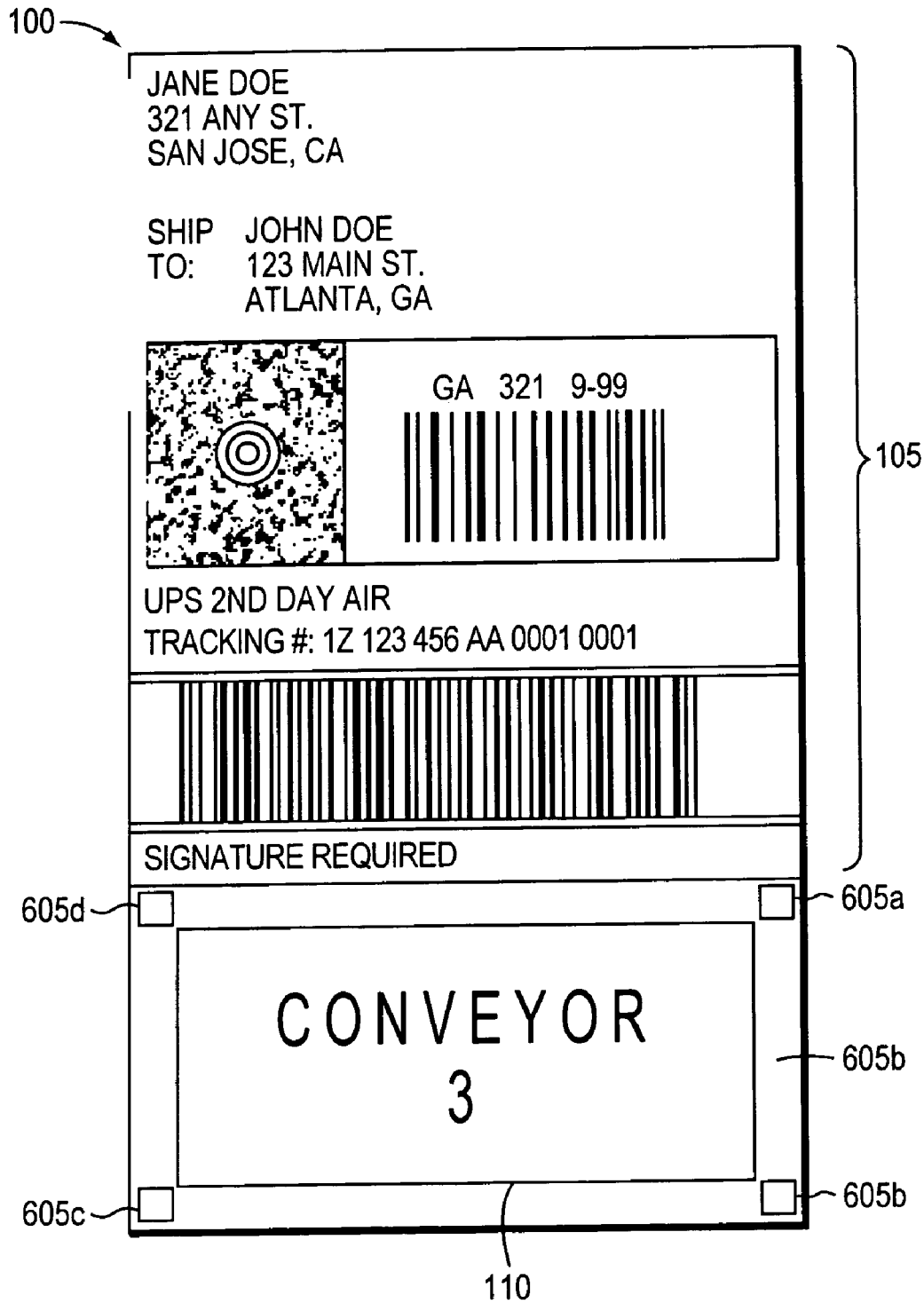
FIG. 6 shows an embodiment of the invented label including a guide for interfacing an external device with the invented label.

FIG. 6 shows a shipping label 100 having standard paper portion 105, and updateable display portion 110. The standard paper of the label shown includes 'ship to' and 'ship from' addresses, and three machine-readable barcodes (one of which is a multidimensional barcode). The updateable display portion is depicted as displaying "Conveyor 3". As will be described later this is an instruction to a human package services provider to place the package on a specific conveyor belt. The shipping label shown also includes a guide 600 having posts 605a-605d. The guide can comprise plastic or other solid material. The purpose of the guide is to positionally orient an external device, such as a label interface device, relative to the updateable visual display of the shipping label.

FIG. 7A shows a perspective view of an updateable visual display 110 and a guide 600 having posts 605a-605d. Although the guide shown has four posts, less or more can be used. FIGS. 7B-7E show alternative post configurations that can be used on the guide. FIG. 7B shows a post having a rectangular cross section and its compatible recess. The recess would be located on the external interface device to receive the post of the guide. Alternatively, the recess can be located on the guide and the post on the external device, or combinations of multiple recesses and posts can be placed on either the guide or the external device. FIG. 7C shows a post and recess having a circular cross section. FIG. 7D shows a post and recess having a keyed circular cross section. Keying can be used to further dictate the positional orientation of the external device relative to the updateable visual display. FIG. 7E shows a tapered post and recess. Tapering can be used to reduce the accuracy required to initially interface an external device with the guide.

Figure 8:
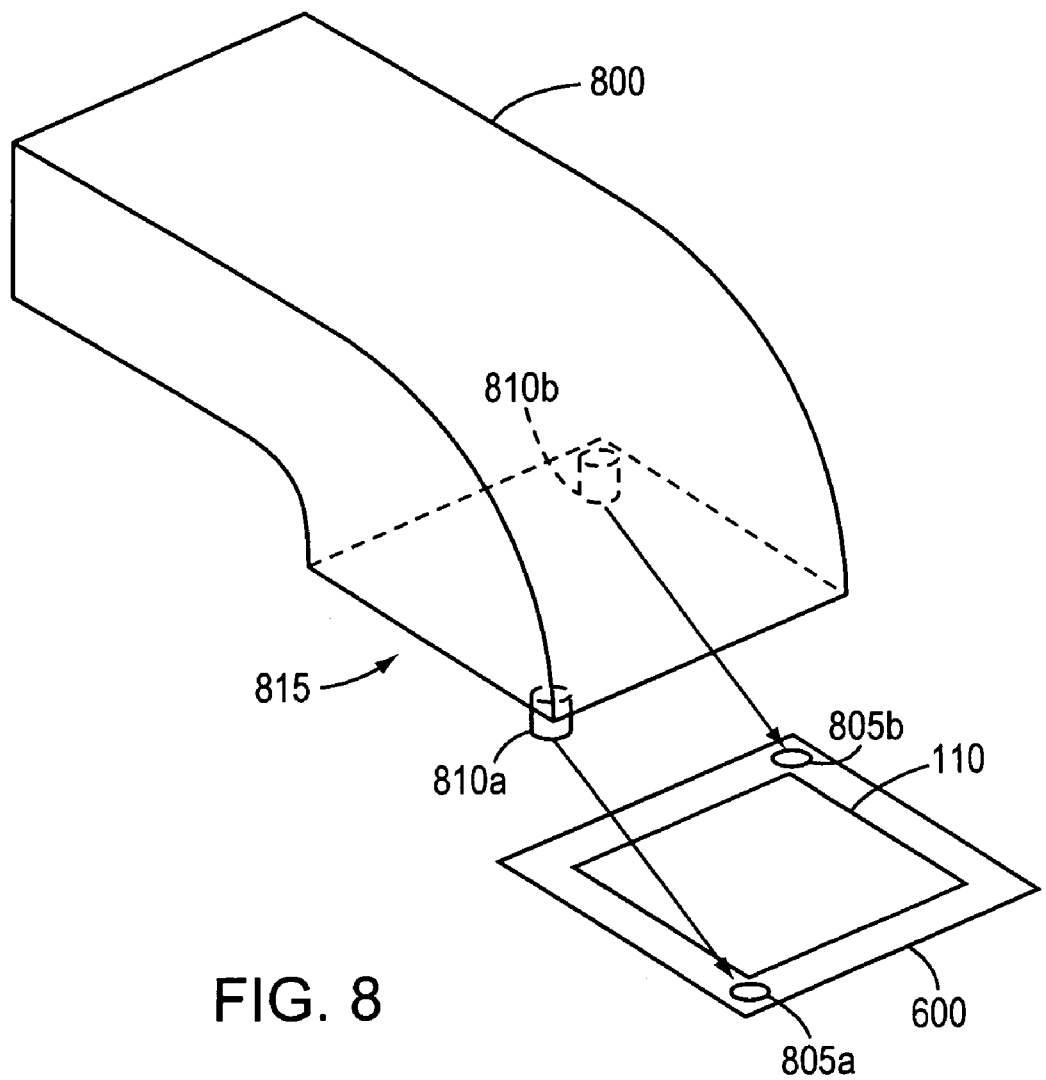
FIG. 8 shows a label interface device having an electric field generator with a surface area at least as large as the surface area of the updateable visual display with which it is interfacing.

FIG. 8 depicts a label interface device 800 according to the present invention having an electric field generator 815 with a surface area at least as large as the surface area of the updateable visual display 110. The label interface device is shown having posts 810a and 810b that can be inserted into recesses 805a and 805b. In this embodiment, the electric field generator of the label interface device is held in proximity to the electronic paper of the updateable visual display. A limit switch on the label interface device can be used to detect that the device is in position. The electric field generator is configured to apply an electric field that causes the electronic paper to display a pattern. The pattern preferably includes human perceivable routing instructions. The instructions preferably appear large enough to be perceived with a quick glance. Brevity of the instructions may also reduce the time needed to comprehend their meaning—leading to increased shipping productivity.

An alternative writer device can comprise a device with a surface capable of generating a localized electric field that is smaller in area than the updatable display device of the present invention. To write an image across the entire electronic paper, the writer can be moved over separate sections of the electronic paper with the electric field generated by the writer being changed as it is moved.

Figure 9A:
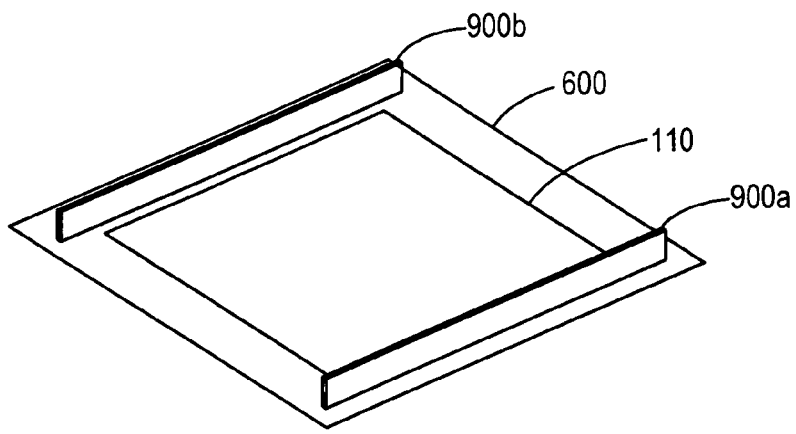
FIGS. 9A-9E illustrate an embodiment of a guide that incorporates ridges for physically orienting an external device relative to the updatable visual display of an invented shipping label.
Figures 9B, 9C, 9D:
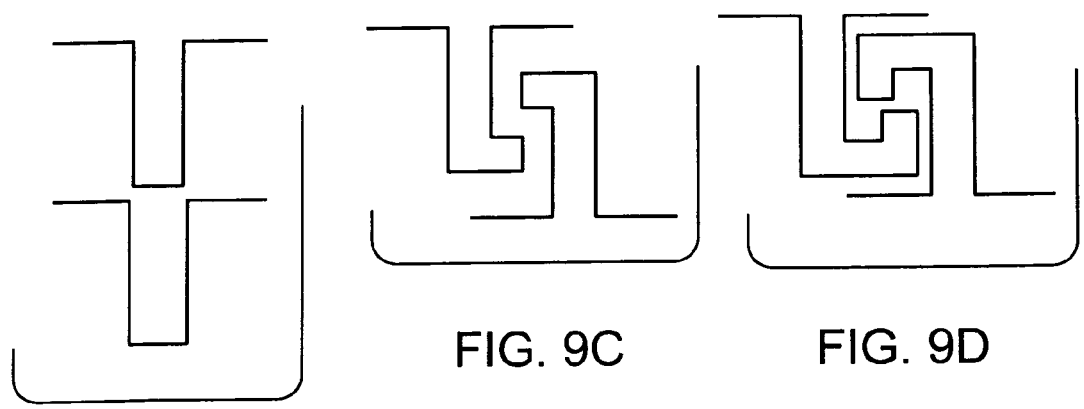
Figure 9E:
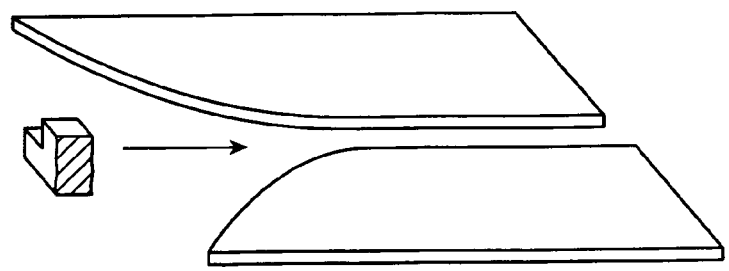

FIG. 9A shows an updateable visual display 110 with a guide 600. The guide shown has ridges 900a and 900b. FIGS. 9B, 9C, and 9D show alternative ridge structures and their corresponding groove or mating structure. FIG. 9E shows a tapered groove that can be used to reduce the accuracy required for initially orienting the label interface device relative to the updateable display device. The structures shown in FIGS. 9A-9E can be used to allow a label interface device to slideably interface with an updateable display device. That is, the structures allow for the label interface device to be positionally oriented to the updateable display as an electric field generator of the label interface device is drawn across the surface of the updateable display.

Figure 10:
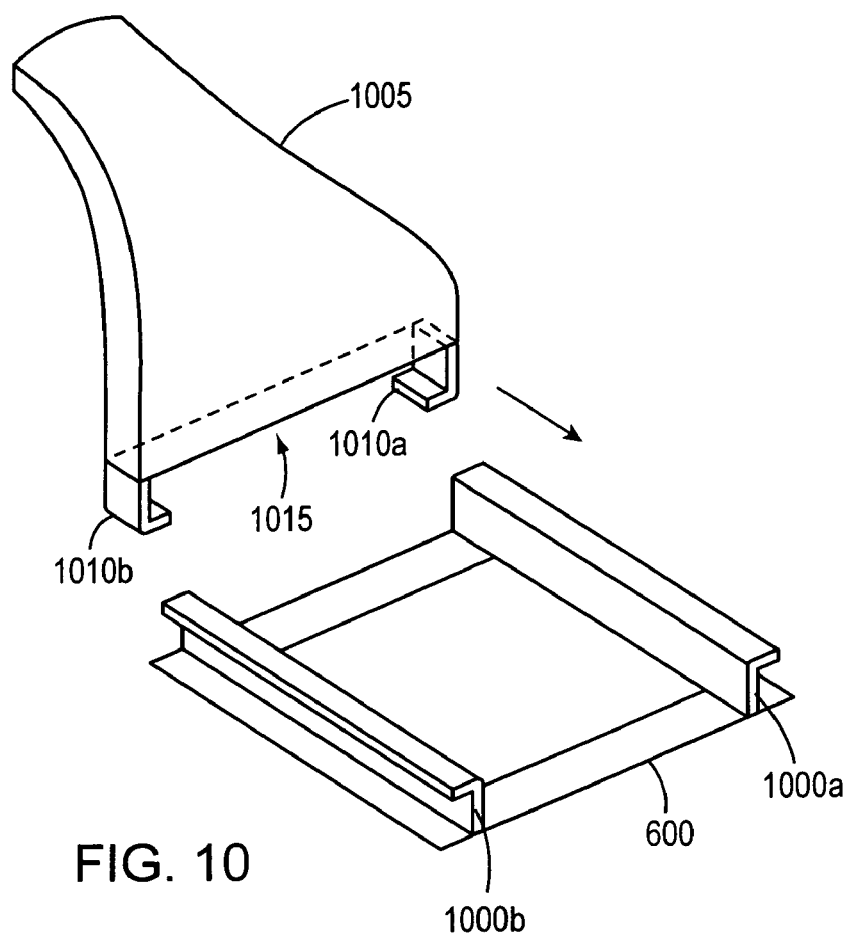
FIG. 10 depicts a label interface device having an electric field generator with a surface area less than the surface area of the updateable visual display with which it is interfacing.

FIG. 10 shows a label interface device 1005 having an electric field generator 1015 that has a surface area less than the surface area of the updateable display. The guide structures 1000a and 1000b can interlock with the guide structures 1010a and 1010b on the label interface device. The label interface device can then be drawn across the updateable display while the interlocked structures keep the electric field generator 1015 in a plane that is parallel the to the plane of the updateable display. As the label interface device slides, its electric field generator is configured to change with the distance it has been moved. Measurement of movement can be accomplished through the use of a magnetic strip located on the label and a magnetic reader on the label interface device. Alternatively, the ridge structures can have holes formed in them, and the label interface device can incorporate an optical device with a light source and receiver to sense pulsating light as the light from the light source is alternately blocked and then passed through the structure. Yet another configuration can implement alternating areas of contrast located on the label along the dimension that the label interface device is sliding that can be optically detected. Contact devices such as wheels or roller balls can be used as well. A user of the label interface device can then "swipe" the label interface device across the updateable display and cause the display to show a pattern.

An abstraction of a writer device having a smaller surface area than the electronic paper is a writer device having a single linear row of charge points instead of a grid. Ideally, the writer has a dimension that is equal to the length of one of the dimensions of the electronic paper. That is, either the width or the height of the electronic paper to be written. The linear writer can then be moved across the surface of the electronic paper. As the writer is "swiped" across the electronic paper, the electric field generated by the linear row of points can be varied to create the desired image on the electronic paper.

Figure 11:
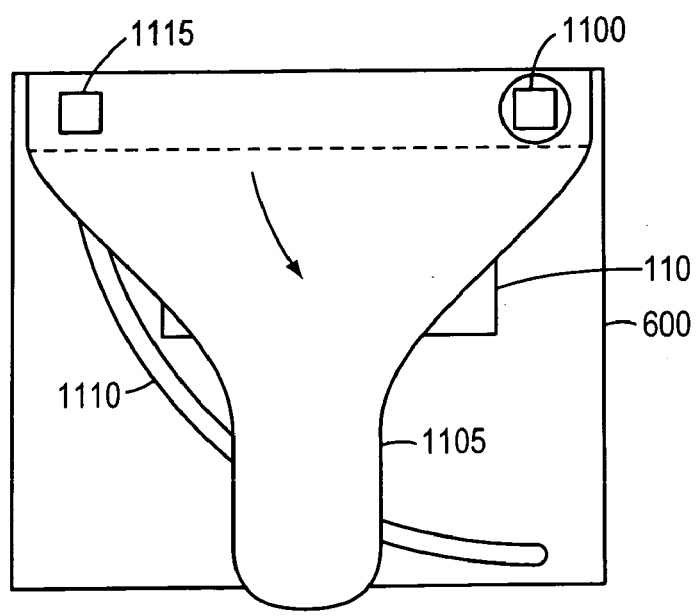
FIG. 11 depicts components of an embodiment of the invented shipping label where the shipping label includes a processor.

FIG. 11 shows a label interface device 1105 that implements a pivoting motion to update the visual display 110. The post/recess interface at 1100 in this embodiment is configured such that the post structure on the label interface device sits in the recess of the guide 600. The post structure remains static, while the rest of the label interface device pivots about point 1100. This motion causes the electric field generator of the label interface device to sweep across the surface of the updateable display. The electric field generator is configured to apply an electric field to the updateable display that changes over the course of the arc to write a pattern to the updateable display. The motion of the label interface device relative to the updateable display can be measured through gearing at the post structure or through a magnetic reader 1115 configured to read the magnetic strip 1110 located on the label.

Figure 12:
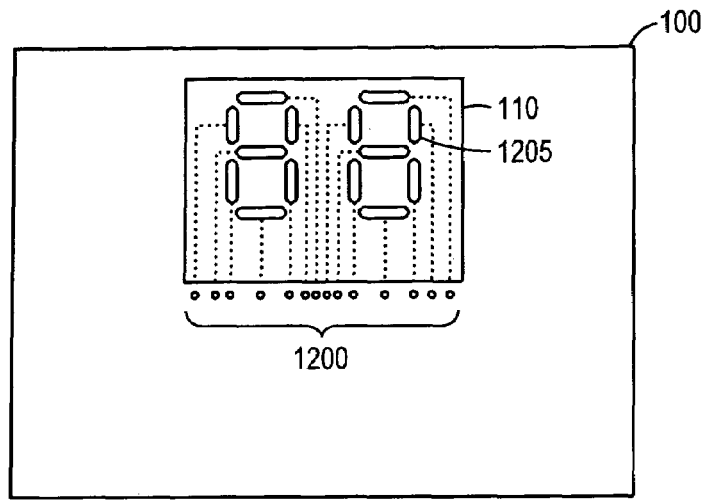
FIG. 12 illustrates a shipping label according to the present invention incorporating external electrodes for updating the shipping label's visual display.

Another option for writing to the electronic paper is utilizing a number of externally accessible conductor pins, electrical contacts, electrodes or the like that connect to a grid of points located behind, or within the electronic paper. A writing device that connects to the pins could then selectively apply an electric field to these pins to cause the electronic paper to display the desired image. An example of this arrangement is shown in FIG. 12. Here two (2), seven segment displays 1205 have been formed of conductive material and placed under the electronic paper of the updateable display. A positive or negative voltage applied to the respective pins can cause the electronic paper to display patterns similar to those of a seven segment LED display. Superior resolution of patterns can be achieved by increasing the number of pins and addressable areas behind the electronic paper.

It should be understood that the writer devices can be handheld or mounted in a stationary position so that packages having the invented label are brought to them either by human carrying or through the movement of a conveyer belt or other mechanical method.

Yet another method of writing to the updateable display device of the present invention incorporates a writable or rewritable RFID tag. A portion of the writable memory contained RFID tag is mapped to the updateable visual display. This mapped portion of the RFID tag is written to using known RFID writing techniques. The updateable visual display is made to display information representative of the data stored in the mapped area of the RFID memory either at the time the RFID tag is written to or at some later time. The power required to change the updateable visual display can come from the power supplied to the RFID through its integrated inductor. Alternatively, the updateable visual display can have a separate power source. This source can be an inductor (separate from the RFID inductor) connected to the updateable visual display, or a battery, or any other power supply previously mentioned.

As mentioned above, the updateable display device may not necessarily be updated at the same time that the portion of the RFID tag mapped to the display is written to. In embodiments in which the updateable display device is electronic paper, the information can remain stored in the RFID tag until the updateable display device is refreshed by supplying power to it. The updateable display device can be implemented as an LCD, LED, active matrix display, or the like. These types of displays can be configured to show the information contained in the mapped portion of the RFID tag intermittently. For example, the display can be activated by pressing a button.

Figure 13:
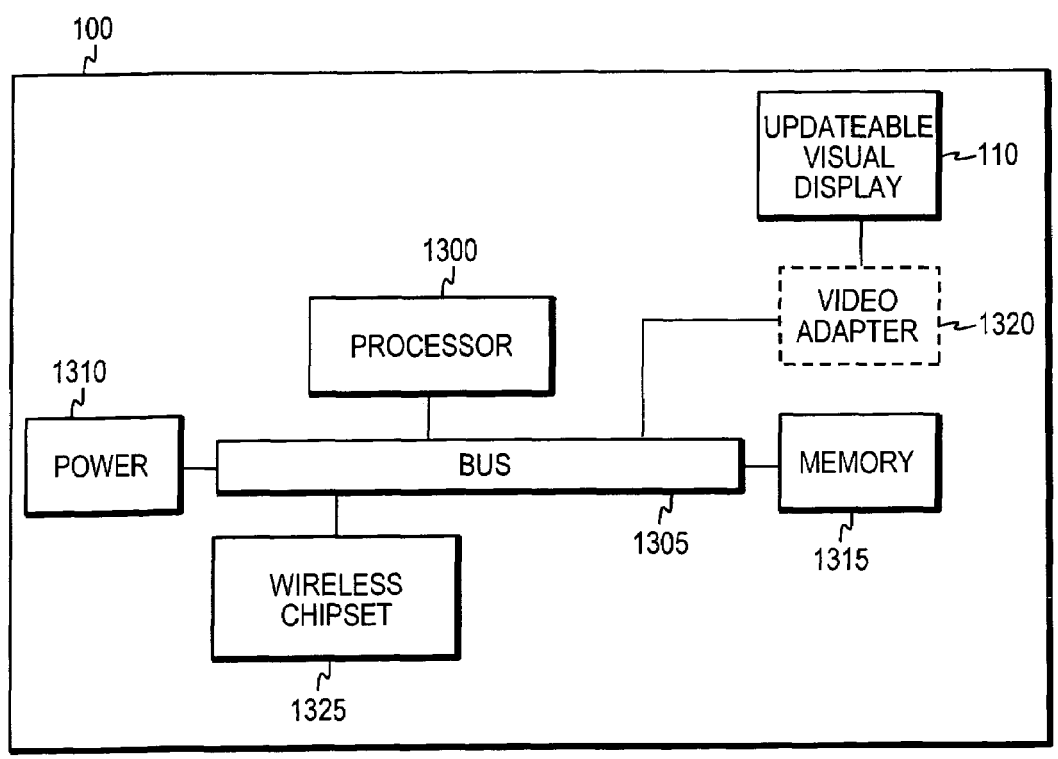
FIG. 13 shows a guide for an updateable visual display having a magnetic strip for communicating relative position to a label interface device.

Another alternative configuration of the invented device includes a processor, and processor-readable memory coupled to the updateable visual display. This configuration is shown in FIG. 13. A processor 1300 is shown connected to bus 1305. Power is supplied to the device by power source 1310. The power source is preferably one or more batteries in this configuration. The processor 1300 communicates with the memory 1315 over the bus. In addition, the device preferably includes a wireless chipset or radio 1325. The wireless chipset can comprise a mobile chipset such as those used in wireless phones, an IEEE 802.11x chipset, a Bluetooth™ chipset, or communicate using other standards known in the art. Due to the cost of the components, this configuration is likely most useful in a reusable application. This configuration would not require a machine-readable label (such as a barcode) or tag (such as an RFID tag) (although either or both can be included) as the processor would be capable of communicating a package identifier to a remote system via the wireless chipset—the identifier being stored in the memory.

The video adapter 1320 is drawn with a dotted line in FIG. 13 to denote that such an adapter may not be necessary. If the updateable display device 110 comprises electronic paper, for example, a video adapter may not be necessary. This would also be true if the display comprises a simple monochrome LCD display like the type used in wrist watches, for example. The video adapter may be needed where the updateable visual display 110 comprises a color active matrix LCD display like those used in notebook computers, or handheld PDAs, or cellphones, for example. If the display 110 is a color display, information can be presented in a coding scheme, in which, for example, higher priority shipments, such as next day shipments, display information in red to denote their priority status. Color coding could be used to denote that a package is on track to meet its scheduled delivery time, or is behind schedule.

A global positioning satellite (GPS) or other satellite positioning system receiver (not shown) can also be included in the embodiment shown in FIG. 13. A GPS receiver can determine its location by measuring signals from satellites in orbit around the earth. This information can be communicated to the processor 1300. The processor can use this information to provide additional information on the updateable display, or transmit information over the wireless chipset to other devices. For example, the current location of the package could be reported to a computer and stored in the shipping company database. Information displayed on the updateable display using the GPS information can include distance to the destination, and distance traveled from the origin location.

The label device according to the present invention can be used for a myriad of purposes in which it would be advantageous to have a human-readable display that can be changed over time or throughout a process such as package delivery. The device is preferably used in processes, such as package delivery, which physically transfer an item or items from one location to another. In such a process, the invented label is preferably affixed to the package being transported. The label can alternatively, or additionally, be attached to a crate, pallet, or the like. The invented device allows instructive information to be visually displayed in a human-readable form to facilitate proper routing and/or handling of the package.

Figure 14:
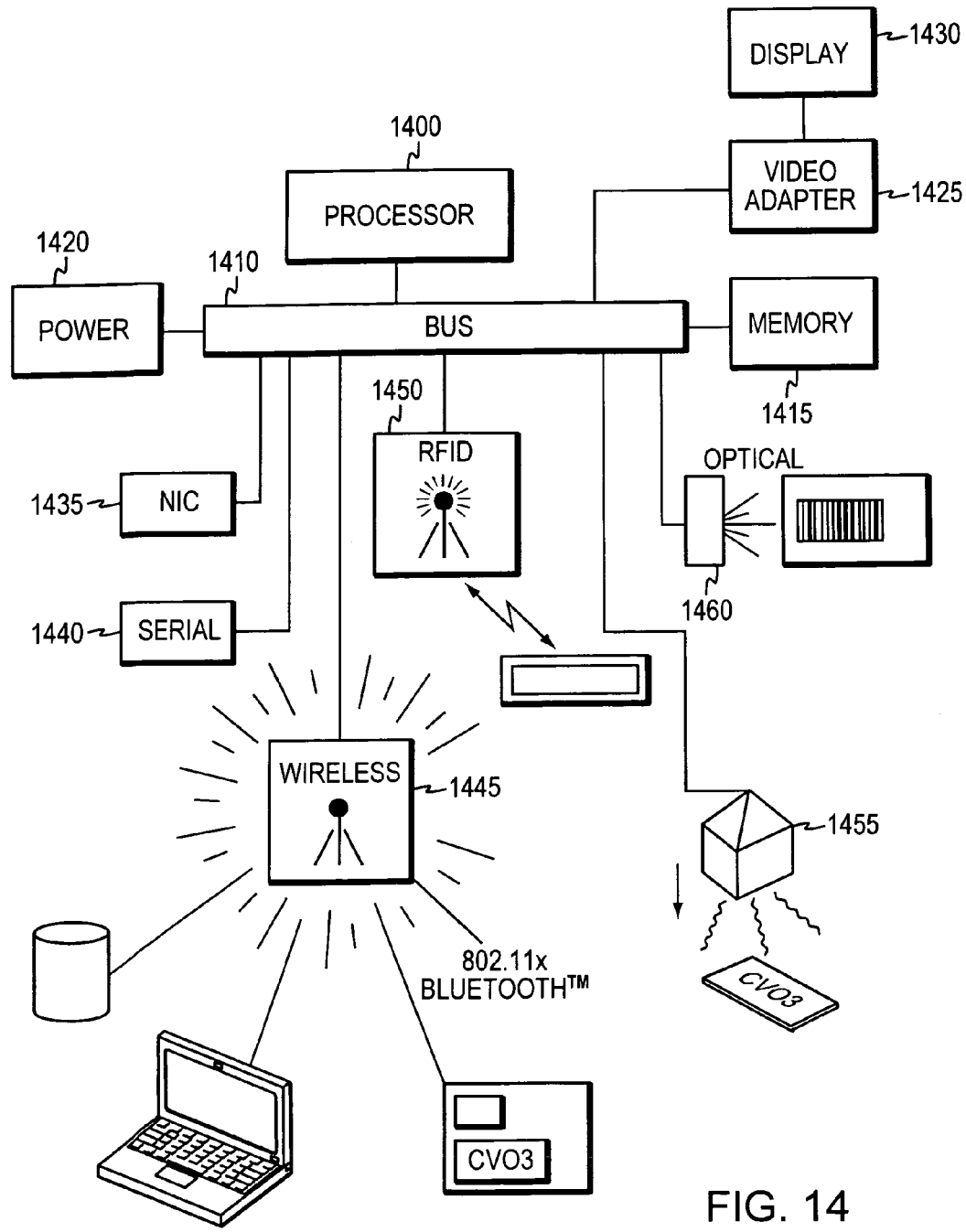
FIG. 14 depicts components of a label interface device according to the present invention.

A label interface device has also been invented for updating the electronic shipping label with an updateable visual display. FIG. 14 shows an embodiment of a label interface device according to the present invention. The label interface device comprises processor 1400 connected to bus 1410. The processor communicates with memory 1415 over the bus. Power is supplied by the power source 1420. The power source can be a battery, or the device can receive power from an external power supply. The processor also communicates over the bus to the video adapter 1425 which displays information on the display 1430. The display can be any of the aforementioned display types or any type of display technology known in the art. The device can communicate with external devices using the network interface card 1435 or serial connection 1440. The device can also include a wireless chipset 1445 such as an IEEE 802.11 compatible chipset or a Bluetooth™ compatible chipset for communicating with other devices. RFID reader and/or writer 1450 can be used to interrogate RFID tags and write to writeable RFID tags. Electric field generator 1455 can be used to update the visual display of labels where the updateable visual display comprises electronic paper. The electric field generator may include a limit switch for determining that the electric field generator is oriented correctly over the electronic paper. The electric field generator may include mechanical, optical, or magnetic means for measuring distance, as described above, where the surface area of the electric field generator is less than the surface area of the electronic paper being updated. The label interface device can additionally include an optical scanner 1460 for reading barcodes.

It should be understood that the label interface device may not have all of the components shown in FIG. 14. The label interface device can be a wireless handheld unit comprising a processor that communicates with a shipping company database, or a wired device that plugs into a serial port of another device such as a personal computer to allow that device to update the invented label.

The invention also includes a method of using an updateable visual display attached to an item to route that item to a destination. It should be understood that while this method can be used with the invented device described above, this method can also be used in cases where the updateable visual display and the machine-readable label or tag are not integrated. That is, the invented method can be used where an updateable visual display is not integrated with a machine-readable label or tag. For example, the updateable visual display can be separate from any machine-readable labels or tags containing package identifiers. A machine-readable label, for example, can be affixed to one side of a package being shipped while the updateable visual display is affixed to a different side of the package box. In such a case, the method is still valid and novel even though the updateable visual display, and the machine-readable label or tag are not part of an integrated device (except for the extent that being affixed to the same package makes them integrated.)

Figure 15:
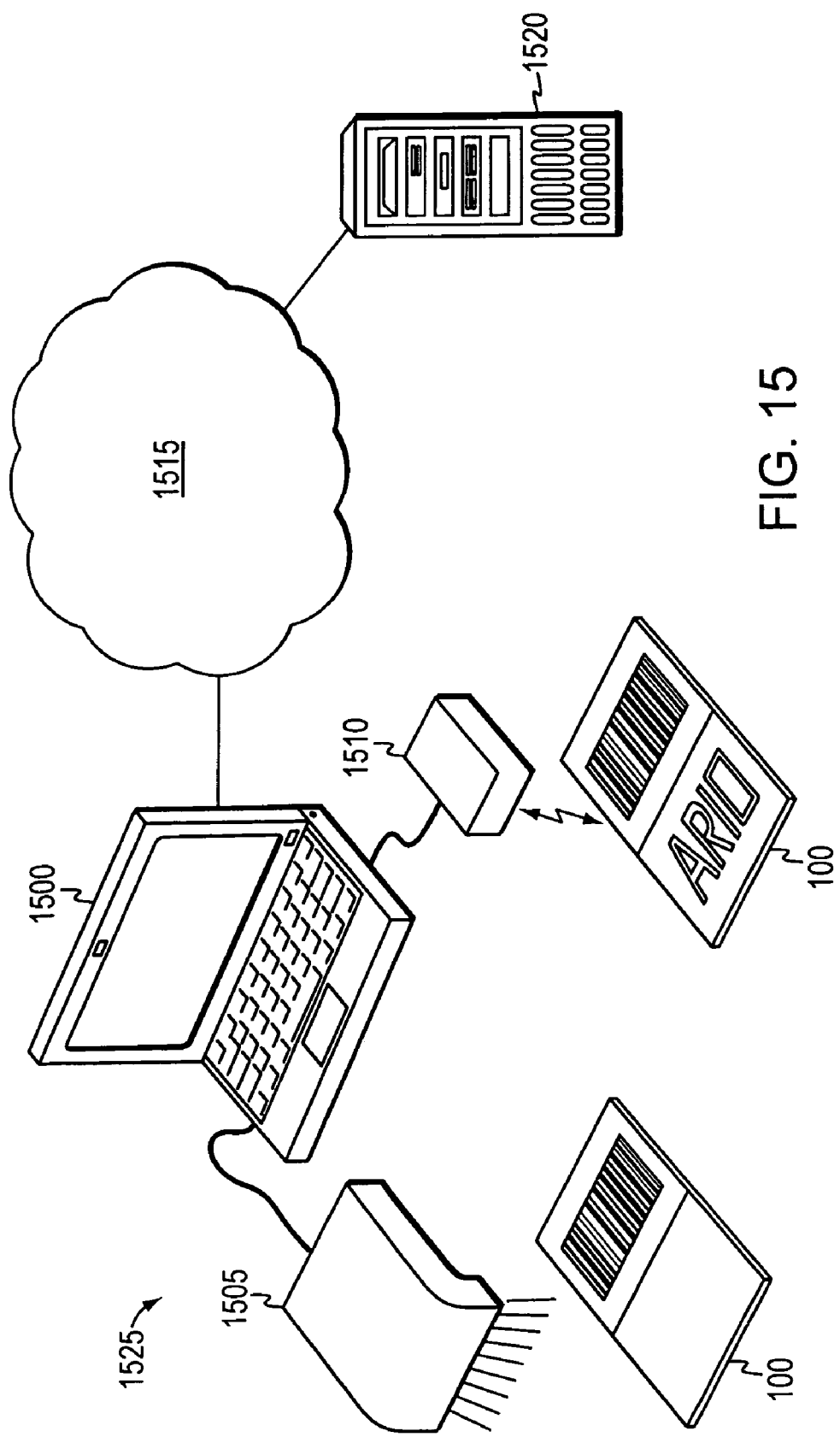
FIG. 15 depicts a system capable of querying a database and updating the visual display of the invented label.

FIG. 15 shows an example of a system 1525 that can be used in the invented method for updating the visual display device attached to the package being shipped according to the invented method. Personal computer 1500 is connected to optical input device 1505 and RFID input/output device 1510. Both of these devices are not required. A unique package identifier can be obtained from either of these peripheral devices. In addition, numerous other types of input devices capable of obtaining a unique package identifier can be used. The computer 1500 is connected to a network 1515 that is in turn connected to at least one database 1520. The connections between devices in the system are not necessarily hard-wired, but can include wireless links for any or all portions thereof. It should be understood that the computer 1500 and any input devices can be integrated into a single device, such as a handheld device.

A label 100 having an updateable visual display, a barcode, and an RFID tag is shown in proximity to the input devices 1505 and 1510. The label is affixed to a package being shipped according to the invented method. The label is shown having an integrated machine-readable label and an updateable visual display. As mentioned previously, however, this is not required. The machine-readable label(s) and the updateable visual display can be affixed to different portions of the package being shipped.

Either the optical input device 1505 or the RFID device 1510 is used to obtain at least a package identifier from the machine-readable portions of the label or tag. The optical input device 1505 can obtain an identifier by scanning a barcode on the label, or the RFID device can activate the RFID tag in the label to cause it to transmit information identifying the package to the RFID device. This step is shown as step 1600 in FIG. 16. The computer 1500 then forms a database query based on the information obtained from the package. The query is sent over the network 1515 to the database 1520. A single database server is depicted in FIG. 15. Multiple servers, however, may be queried. Parcel shipping companies generally have multiple systems that store information regarding packages being handled by the company. A query of multiple database systems is within the scope of the invention. This is step 1605 shown in the flowchart of FIG. 16. The computer 1500 can optionally include information regarding the present location of the package in its query. Package location information may not be needed if recent location scans have been performed that reported the location of the package to the database server(s)/system(s). The IP address or other network ID of the computer 1500 can serve as the location information.

The database 1520 searches one or more tables based on the package identifier information in the query (and this again can include a search of multiple databases). Once the database locates the record or records associated with the package identifier, detailed information regarding the package from those records is returned to the processor of computer 1500 as is shown in step 1610 of FIG. 16. The information can be as narrow as a single routing instruction or as broad as each item of information stored in the database regarding the package associated with that package identifier.

If only a routing instruction is to be returned, then the database 1520 (or an intermediate system not shown) performs an analysis based on the destination of the package and its current location to determine how it should be routed. The routing determination can also include consideration of a number of parameters including, but not limited to, the class of service of the package, the current configuration of the hub in which the package is located, and the travel schedules of vehicles departing the hub. Many other logistical factors which are known in the parcel shipping industry can be included in the routing determination.

If the information returned to computer 1500 comprises detailed information regarding the package, but no routing instructions, then the processor in computer 1500 can determine the proper routing for the package based on the information from the database 1520.

Figure 16:
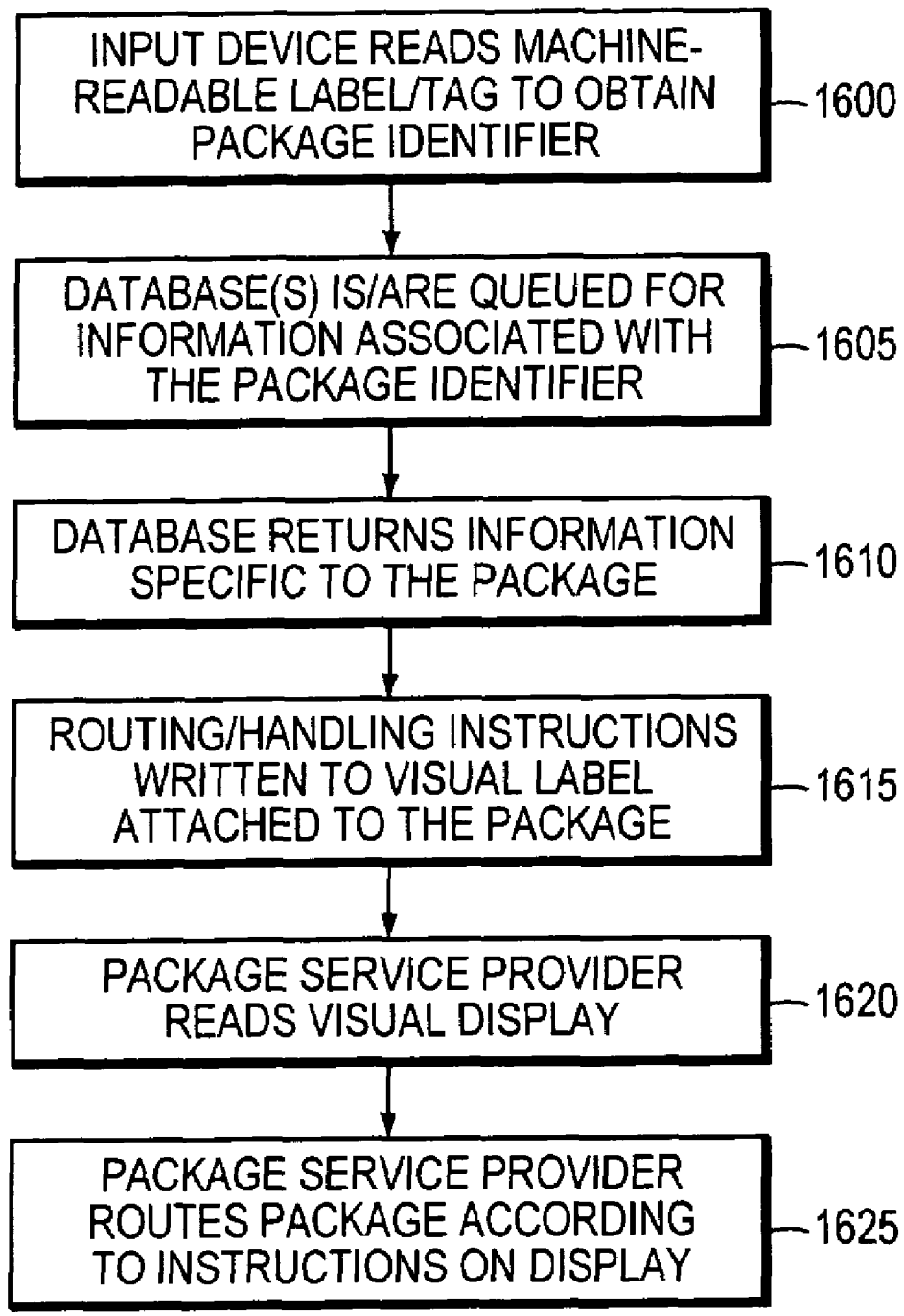
FIG. 16 is a flowchart describing a method for updating the information shown on the invented shipping label.

Once a proper course of action regarding the routing of the package has been determined, the routing instructions can be indicated on the updateable visual display attached to the package as is shown in step 1615 of FIG. 16. The instructions can be as simple as a brief code indicating, for example, a conveyor belt on which the package should be placed, or as complex as a few sentences or a paragraph, for example, giving detailed instructions regarding the routing of the package.

The writing of the instructions to the updateable visual display can occur in a number of ways discussed above regarding the discussion of the invented label. An electronic paper writing device may be placed in close proximity to the display to change the display using an electric field, for example, or the RFID device 1510 can be used, for example, to write information to the RFID tag. In the latter case, the RFID memory containing the routing instructions is mapped to the updateable visual display. Methods of powering this process are also discussed above regarding the invented label. The instructions written to the updatable visual display should be perceptible by a human.

After the routing information is written to the updateable display, a human package service provider reads the routing instructions on the visual display in step 1620 of FIG. 16. The package service provider then takes an action consistent with the instructions shown to route the package in step 1625.

This method eliminates, or at least reduces, the need for package service providers to visually scan a zip code, for example, on a package and recall from memory where packages shipped to that zip code should be routed within a hub facility. It should also be recognized that while it would likely not be optimum, the system 1525 could be implemented locally at a hub location. For example, the database on server 1520 could be located in the memory of computer 1500.

Figure 17:
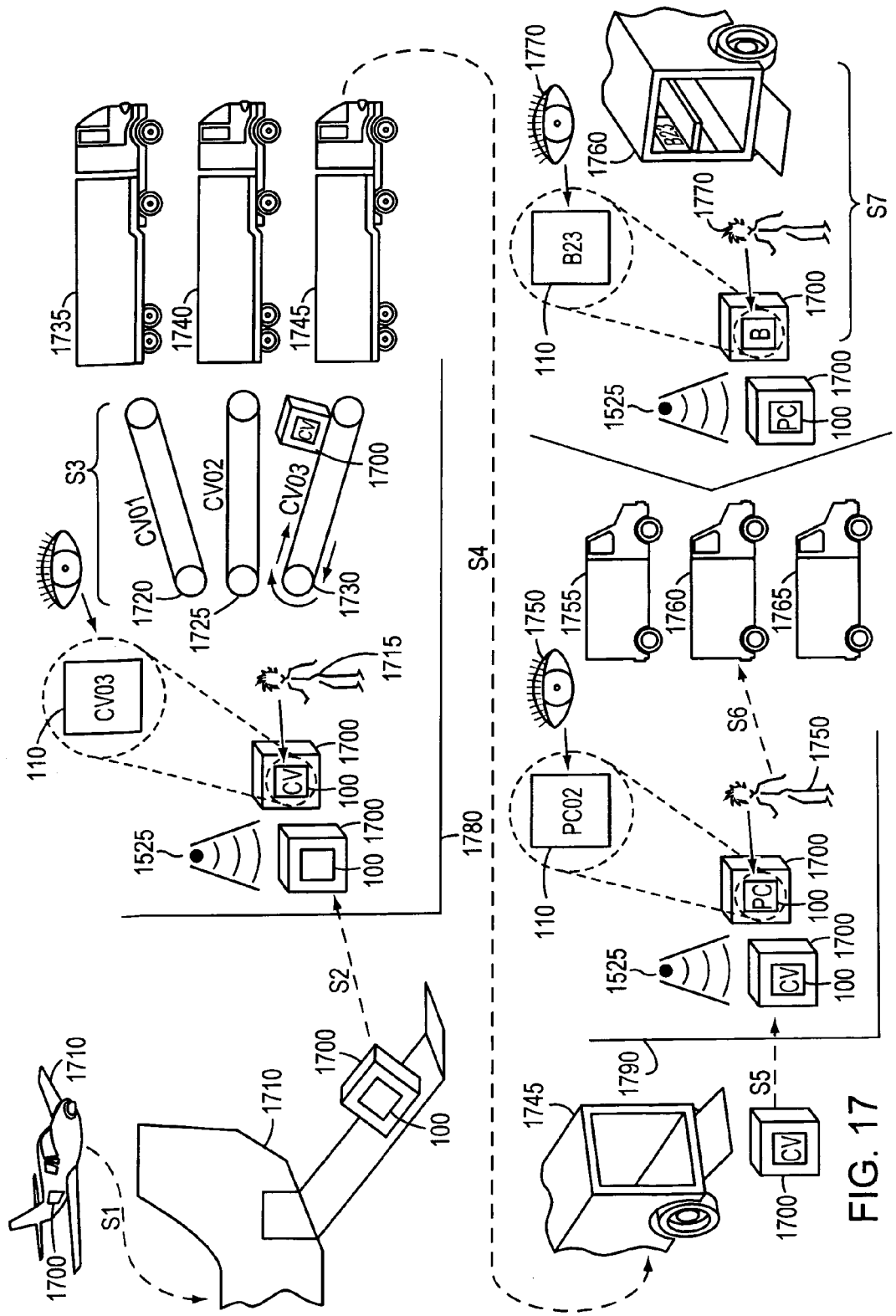
FIG. 17 shows a package shipping procedure incorporating the invented label.

FIG. 17 depicts an embodiment of the method of the current invention in use. A cargo plane 1710 carrying a package 1700 is shown in the upper left of FIG. 17. Following dotted line S1, this plane lands at a package delivery company's hub facility 1780. The plane 1710 is shown outside of the hub 1780, but the plane 1710 could be inside a hangar of the hub facility 1780.

The package 1700 is shown having an electronic shipping label 100 coming down a ramp from the cargo plane 1710. In the embodiment of FIG. 17, the package identifier is obtained using RFID, and the updateable visual display portion of the electronic shipping label is written using a writable RFID tag that has at least some portion of its memory mapped to the display. Following the dotted line S2, the package is brought near the electronic shipping label interface writing system 1525. The RFID reader energizes the coil located in the RFID tag embedded in the electronic shipping label 100, causing it to transmit at least a package identifier to the reader. The identifier is then transferred to a computer (not shown) that queries the parcel shipping company database(s) for information regarding the package 1700. Package information is returned to the computer. This information contains the routing code "CV03". This code, can indicate, for example, that the package should be placed on conveyor CV03 which is the conveyor belt 1730 shown in the figure. The computer, using the RFID writer, causes "CV03" to be placed on the updateable visual display portion 110 of the electronic shipping label 100. The package service provider 1715 looks at the updateable visual portion 110 of the electronic shipping label 100 to determine which of the three conveyor belts 1720, 1725, and 1730 to place the package 1700. The package service provider sees CV03 and places the package 1700 on the conveyor belt 1730 which leads to package truck 1745.

Following dotted line S4, the package truck 1745 travels to another hub facility 1790 and the package 1700 is unloaded and carried near the electronic shipping label interface system 1525 located at the hub facility 1790. At this stage, the package service provider 1750 is charged with determining which packages should be routed to a number of package delivery cars, 1755, 1760, and 1765. Following the previously described process, "PC02" is displayed on the updateable visual display portion 110 of the electronic shipping label 100. The package service provider 1750 reads this instruction and places the package 1700 near the loading area for package car 2 (PC02), 1760.

In the loading area for package car 1760, the package service provider 1770 has the responsibility of loading the package car 1760. In order to facilitate delivery of the packages that will be loaded into the package car, the packages are placed, for example, in specific parts of the car's cargo area corresponding to areas on the package car's route. The electronic shipping label interface system 1725 located near the rear of package car 1760 causes "B23" to be written to the updateable visual display 110 of the electronic shipping label 100. B23 refers to a specific location within the package car 1760. The package service provider reads the updateable visual display portion 100 of the electronic shipping label 100 to determine where to place the package in the package car 1760, and places the package 1700 in the area designated as B23.

The dynamic nature of the label of the present invention and the updateable visual display as used in the invented method allows parcel delivery companies to offer new services to their customers and even a new method of shipping packages.

While a package is in route to its destination, the shipper or recipient could request that the package either be returned to the shipper, shipped to a different address than the address first requested, or that the level of service on the package be changed. It is possible for customers to make these requests now. The shipping company, however, may not be able to fulfill these requests while the package is in route, or may not be able to do so efficiently.

By using the invented device, and/or method, a customer can request one of these changes to the shipping process and have that request reflected in the shipping company's database or databases. If the package involved has an electronic shipping label attached to it, the routing instructions provided on the updatable visual display can implement the proper routing to comply with the customer request.

For example, a manufacturer of products on the west coast can ship a packaged order to a location of a retail chain in Atlanta, Ga. After the package has been shipped, but before it has reached Atlanta, the manufacturer is contacted by a manager of the retail chain who informs the manufacturer that the supply of the product in Atlanta is sufficient, but the chain's Baltimore, Md. location has sold out of the product. The manufacturer can then contact the shipping company to request that the destination of the package be changed from the retail chain's Atlanta location to the address of the Baltimore location. Once the shipping company makes the changes in its database(s), the routing instructions displayed on the electronic label are then proper for the new destination address. The products reach the retail chain's Baltimore location sooner than would have been possible without the use of an electronic shipping label. It is possible to do this on a package-by-package basis so that if 50 packages were sent to Atlanta, 25 could be diverted to Baltimore instead of the entire shipment, so long as the packages have their own electronic shipping label.

A new manner of shipping packages is also made possible by the invented device and method. Packages can be shipped without a destination. That is, packages can be placed in the package delivery process without the shipper indicating where the packages are to be shipped. Recall, that in the example of the product manufacturer above, the manufacturer is located on the west coast, and the retail chain has numerous locations on the east coast. The manufacturer could have packages picked up for shipping at the manufacturing facility without designating a destination location for these packages. The manufacturer may, however, need to indicate a general direction or a general area where the packages should be sent. While the packages are heading toward the east coast the manufacturer receives an email from the retail chain that indicates the number of products required at each of its locations. The manufacturer can then contact the shipping company with this information so that the destinations of the packages already in transit can be updated in the shipping company database. The routing instructions displayed on the electronic shipping label can then be used to send the package to the desired destinations. Indeed, the entire shipping label on a package can comprise electronic paper. The delivery address, sending address, tracking number, barcodes, etc., i.e., everything currently displayed on a shipping label can be printed on electronic paper so that it can be altered throughout the shipping process.

That which is claimed:

1. A package shipping label comprising:
   a unique package identifier;
   an electronically updateable visual display, said visual display configured to change upon the application of a localized electric field;
   a guide for interfacing with an external device, wherein the visual display is attached to the guide, and wherein the guide is configured to:
   slideably interface with an external device; and,
   communicate a distance to an external device interfacing with the guide as the external device slides across the guide, the distance representing the movement of the external device relative to the shipping label, wherein the distance is communicated via alternating levels of contrasting surface appearing in series on the shipping label.

2. The package shipping label of claim 1 wherein:
the unique package identifier is located on the visual display.
3. The package shipping label of claim 2 wherein:
the unique package identifier located on the visual display is machine readable.
4. The package shipping label of claim 3 wherein:
the unique package identifier located on the visual display is a barcode.
5. The package shipping label of claim 1 further comprising:
standard paper, the visual display being attached to the standard paper.
6. The package shipping label of claim 5 wherein:
the unique package identifier is located on the standard paper.
7. The package shipping label of claim 6 wherein:
the unique package identifier located on the standard paper is machine readable.
8. The package shipping label of claim 7 wherein:
the unique package identifier is a barcode.
9. The package shipping label of claim 1 wherein:
the visual display comprises electronic paper.
10. The package shipping label of claim 1 wherein:
the visual display is configured to display two colors, where the first color is displayed at points where the applied electric field is positive and the second color is displayed at points where the applied electric field is negative.
11. The package shipping label of claim 1 wherein:
the visual display retains its output after the electric field is removed.
12. The package shipping label of claim 1 wherein:
the guide is configured to spatially orient an electric field generator of the external device to the visual display.
13. The package shipping label of claim 12 wherein:
the guide is configured to spatially orient the electric field generator of the external device so that the electric field generator sits in a plane parallel to a plane of the visual display.
14. The package shipping label of claim 1 wherein:
the guide comprises at least one groove.
15. The package shipping label of claim 1 wherein:
the guide comprises at least one ridge.
16. The package shipping label of claim 1 wherein:
the guide comprises at least one recess.
17. The package shipping label of claim 1 wherein:
the distance is communicated via a magnetic strip affixed to the shipping label.
18. The package shipping label of claim 1 wherein:
the distance is communicated via alternating physical features located in series on the shipping label.
19. The package shipping label of claim 1 further comprising:
a radio frequency identification tag having a memory that is at least readable, the visual display being attached to the radio frequency identification tag.
20. The package shipping label of claim 19 wherein:
the unique package identifier is stored in the memory.
21. The package shipping label of claim 20 wherein:
the radio frequency identification tag is configured to transmit the unique package identifier stored in the memory in response to interrogation by an external device.
22. The package shipping label of claim 20 wherein:
the memory of the radio frequency identification tag is writeable.
23. The package shipping label of claim 22 wherein:
the visual display is configured to change upon the application of a localized electric field.
24. The package shipping label of claim 20 further comprising:
an electric field generator configured to apply an electric field to the visual display.
25. The package shipping label of claim 24 wherein:
the electric field generator is disposed behind the visual display and is configured to generate a localized electric field to cause the visual display to show a pattern.
26. The package shipping label of claim 25 wherein:
at least a portion of the writeable memory of the radio frequency identification tag is mapped to the electric field generator, the electric field generator being configured to cause a pattern to be shown on the visual display that corresponds to the contents of the portion of the writeable memory mapped to the electric field generator.
27. The package shipping label of claim 26 wherein:
the electric field generator is configured to receive power from an inductive power source of the radio frequency identification tag.
28. The package shipping label of claim 26 further comprising:
power terminals configured to accept power input from an external device, the power terminals being electrically connected to the electric field generator.
29. The package shipping label of claim 26 further comprising:
a power source electrically connected to the electric field generator.
30. The package shipping label of claim 29 wherein:
the power source comprises a battery.
31. The package shipping label of claim 29 wherein:
the power source comprises an inductor.
32. The package shipping label of claim 29 wherein:
the power source comprises a capacitor.
33. The shipping label of claim 11 further comprising:
a plurality of conductors disposed behind the visual display, the conductors being insulated from each other and having externally accessible connection points, the conductors configured to apply an electric field to the visual display when a voltage is applied to the connection points, the conductors arranged so that selective application of voltage to the connection points causes a pattern to be shown on the visual display.
34. The package shipping label of claim 1 further comprising:
a processor;
a memory;
a wireless radio; and
a power source, the power source providing power to the processor, memory, and wireless radio,
the unique package identifier being stored in the memory,
the wireless radio configured to provide communication between the processor and an external device,
the processor configured to retrieve from the memory and transmit via the wireless radio the unique package identifier to the external device at multiple points along the route from origin to destination, to receive instructions from the external device at the multiple points along the route, and to show messages generated by the processor based on respective instructions on the visual display to assist human handlers in routing the package at multiple points along the route.
35. The package shipping label of claim 34 wherein:
the visual display is a liquid crystal display.

36. The package shipping label of claim 34 wherein:
the visual display is a vacuum fluorescent display.
37. The package shipping label of claim 34 wherein:
the visual display comprises light emitting diodes.
38. The package shipping label of claim 34 further comprising:
a switch electrically connected to the power source and the visual display, the switch being configured to provide power to the visual display when the switch is operated.
39. The package shipping label of claim 34 wherein:
the wireless radio communicates according to IEEE 802.11 wireless standards.
40. The package shipping label of claim 34 wherein:
the wireless radio communicates according to Bluetooth™ wireless standards.
41. A package shipping label comprising:
a unique package identifier;
an electronically updateable visual display, said visual display configured to change upon the application of a localized electric field;
a guide for interfacing with an external device, wherein the visual display is attached to the guide, and wherein the guide is configured to:
slideably interface with an external device; and,
communicate a distance to an external device interfacing with the guide as the external device slides across the guide, the distance representing the movement of the external device relative to the shipping label, wherein the distance is communicated via alternating physical features located in series on the shipping label.
42. The package shipping label of claim 41 wherein:
the unique package identifier is located on the visual display.
43. The package shipping label of claim 42 wherein:
the unique package identifier located on the visual display is machine readable.
44. The package shipping label of claim 43 wherein:
the unique package identifier located on the visual display is a barcode.
45. The package shipping label of claim 41 further comprising:
standard paper, the visual display being attached to the standard paper.
46. The package shipping label of claim 45 wherein:
the unique package identifier is located on the standard paper.
47. The package shipping label of claim 46 wherein:
the unique package identifier located on the standard paper is machine readable.
48. The package shipping label of claim 47 wherein:
the unique package identifier is a barcode.
49. The package shipping label of claim 41 wherein:
the visual display comprises electronic paper.
50. The package shipping label of claim 49 wherein:
the visual display is configured to display two colors, where the first color is displayed at points where the applied electric field is positive and the second color is displayed at points where the applied electric field is negative.
51. The package shipping label of claim 49 wherein:
the visual display retains its output after the electric field is removed.
52. The package shipping label of claim 41 wherein:
the guide is configured to spatially orient an electric field generator of the external device to the visual display.
53. The package shipping label of claim 41 wherein:
the guide is configured to spatially orient the electric field generator of the external device so that the electric field generator sits in a plane parallel to a plane of the visual display.
54. The package shipping label of claim 41 wherein:
the guide comprises at least one groove.
55. The package shipping label of claim 41 wherein:
the guide comprises at least one ridge.
56. The package shipping label of claim 41 wherein:
the guide comprises at least one recess.
57. The package shipping label of claim 41 wherein:
the distance is communicated via a magnetic strip affixed to the shipping label.
58. The package shipping label of claim 41 wherein:
the distance is communicated via alternating physical features located in series on the shipping label.
59. The package shipping label of claim 41 further comprising:
a radio frequency identification tag having a memory that is at least readable, the visual display being attached to the radio frequency identification tag.
60. The package shipping label of claim 59 wherein:
the unique package identifier is stored in the memory.
61. The package shipping label of claim 60 wherein:
the radio frequency identification tag is configured to transmit the unique package identifier stored in the memory in response to interrogation by an external device.
62. The package shipping label of claim 60 wherein:
the memory of the radio frequency identification tag is writeable.
63. The package shipping label of claim 62 wherein:
the visual display is configured to change upon the application of a localized electric field.
64. The package shipping label of claim 60 further comprising:
an electric field generator configured to apply an electric field to the visual display.
65. The package shipping label of claim 64 wherein:
the electric field generator is disposed behind the visual display and is configured to generate a localized electric field to cause the visual display to show a pattern.
66. The package shipping label of claim 65 wherein:
at least a portion of the writeable memory of the radio frequency identification tag is mapped to the electric field generator, the electric field generator being configured to cause a pattern to be shown on the visual display that corresponds to the contents of the portion of the writeable memory mapped to the electric field generator.
67. The package shipping label of claim 66 wherein:
the electric field generator is configured to receive power from an inductive power source of the radio frequency identification tag.
68. The package shipping label of claim 66 further comprising:
power terminals configured to accept power input from an external device, the power terminals being electrically connected to the electric field generator.
69. The package shipping label of claim 66 further comprising:
a power source electrically connected to the electric field generator.
70. The package shipping label of claim 69 wherein:
the power source comprises a battery.
71. The package shipping label of claim 69 wherein:
the power source comprises an inductor.

72. The package shipping label of claim 69 wherein:
the power source comprises a capacitor.

73. The shipping label of claim 51 further comprising:
a plurality of conductors disposed behind the visual display, the conductors being insulated from each other and having externally accessible connection points, the conductors configured to apply an electric field to the visual display when a voltage is applied to the connection points, the conductors arranged so that selective application of voltage to the connection points causes a pattern to be shown on the visual display.

74. The package shipping label of claim 41 further comprising:
a processor;
a memory;
a wireless radio; and
a power source, the power source providing power to the processor, memory, and wireless radio,
the unique package identifier being stored in the memory,
the wireless radio configured to provide communication between the processor and an external device,
the processor configured to retrieve from the memory and transmit via the wireless radio the unique package identifier to the external device at multiple points along the route from origin to destination, to receive instructions from the external device at the multiple points along the route, and to show messages generated by the processor based on respective instructions on the visual display to assist human handlers in routing the package at multiple points along the route.

75. The package shipping label of claim 74 wherein:
the visual display is a liquid crystal display.

76. The package shipping label of claim 74 wherein:
the visual display is a vacuum fluorescent display.

77. The package shipping label of claim 74 wherein:
the visual display comprises light emitting diodes.

78. The package shipping label of claim 74 further comprising:
a switch electrically connected to the power source and the visual display, the switch being configured to provide power to the visual display when the switch is operated.

79. The package shipping label of claim 74 wherein:
the wireless radio communicates according to IEEE 802.11 wireless standards.

80. The package shipping label of claim 74 wherein:
the wireless radio communicates according to Bluetooth™ wireless standards.

* * * * *